United States Patent [19]
Bitzel

[11] Patent Number: 4,696,211
[45] Date of Patent: * Sep. 29, 1987

[54] METHOD AND APPARATUS FOR NIBBLING CUTOUTS WITH RECTILINEAR AND CURVILINEAR CONTOURS BY ROTATION OF TOOLING WITH CUTTING SURFACES OF RECTILINEAR AND CURVILINEAR CONTOURS AND NOVEL TOOLING THEREFOR

[75] Inventor: Hubert Bitzel, Ditzingen, Fed. Rep. of Germany

[73] Assignee: Trumpf GmbH & Co., Ditzingen, Fed. Rep. of Germany

[*] Notice: The portion of the term of this patent subsequent to Jun. 23, 2004 has been disclaimed.

[21] Appl. No.: 662,132

[22] Filed: Oct. 18, 1984

[51] Int. Cl.⁴ ............................................. B26D 5/22
[52] U.S. Cl. ........................................ 83/49; 83/373; 83/559; 83/686; 83/916
[58] Field of Search ................... 83/49, 916, 373, 559, 83/560, 556, 561, 562, 685

[56] References Cited

U.S. PATENT DOCUMENTS

| | | | |
|---|---|---|---|
| 364,262 | 6/1887 | Kittredge | 83/916 |
| 1,958,941 | 5/1934 | Chapman | 83/916 |
| 2,088,202 | 7/1937 | Gray | 83/573 |
| 2,365,997 | 12/1944 | Stine et al. | 83/685 |
| 2,650,663 | 9/1953 | Wales et al. | 83/916 |
| 3,269,240 | 8/1966 | Killaly et al. | 83/916 |
| 4,412,469 | 11/1983 | Hirata et al. | 83/556 |

FOREIGN PATENT DOCUMENTS

| | | | |
|---|---|---|---|
| 358440 | 3/1930 | United Kingdom | 83/916 |
| 665777 | 1/1952 | United Kingdom | 83/916 |

*Primary Examiner*—E. R. Kazenske
*Assistant Examiner*—Hien Huy Phan

[57] ABSTRACT

A punch press has a punch support and die support which are rotatable about a common vertical axis, and a drive mechanism for rotating and effecting the reorientation of the tooling relative to the X and Y axes of the punch press. In this fashion, rotation of the tooling will enable reorientation of single cutting surface, and location of various of the differently contoured cutting surfaces at the desired cutting position to effect cutouts of different contours or angular orientation in a workpiece relative to the X and Y axes. The punch has a cutting portion which is of a cross section providing at least one arcuate cutting surface $A^1$ defined by the radius $R^1$ and at least one rectilinear cutting surface $A^2$. In accordance with one embodiment, the punch tooling is desirably of elongated cross section with a length L in its elongated axis and a width W in its transverse axis which is less than ½ L. Movement of the sheet material along the X and Y axes together with rotation of the tooling enables relatively smooth curvilinear and rectilinear contoured surface portions to be nibbled with a single set, or limited number of sets, of tooling.

13 Claims, 24 Drawing Figures

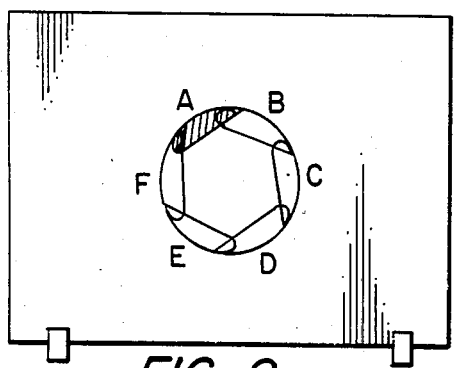
FIG. 9
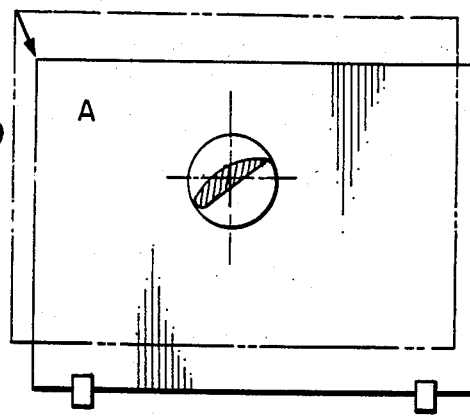
FIG. 10
FIG. 11
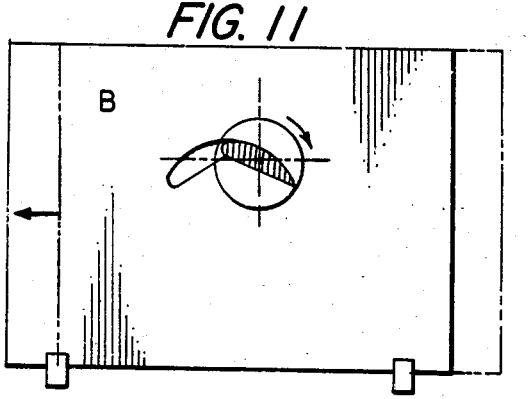
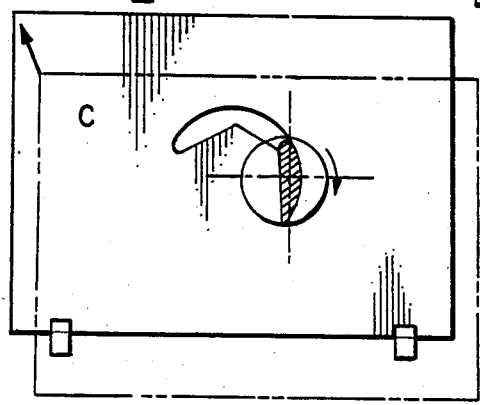
FIG. 12
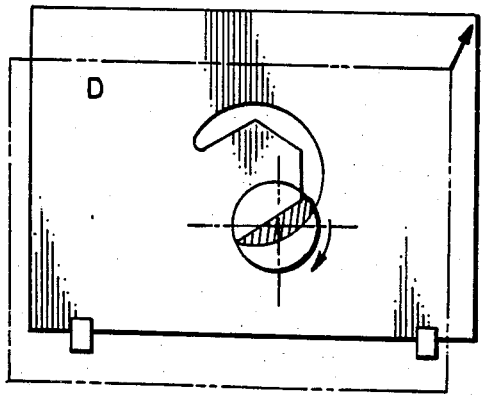
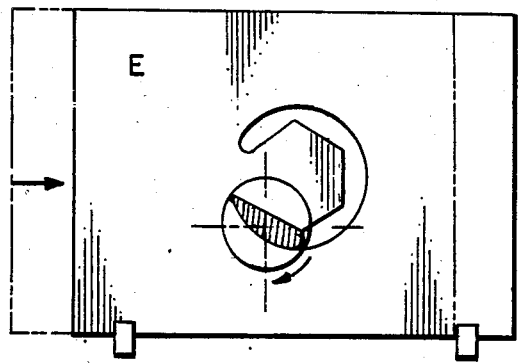
FIG. 14
FIG. 13
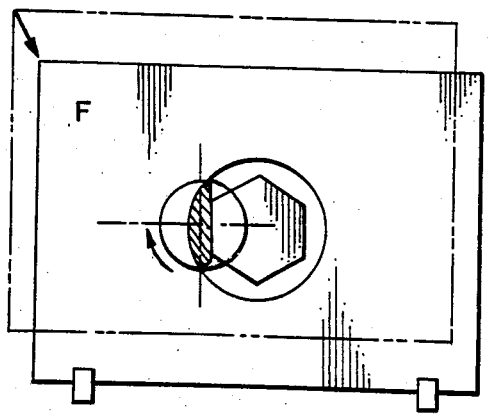
FIG. 15

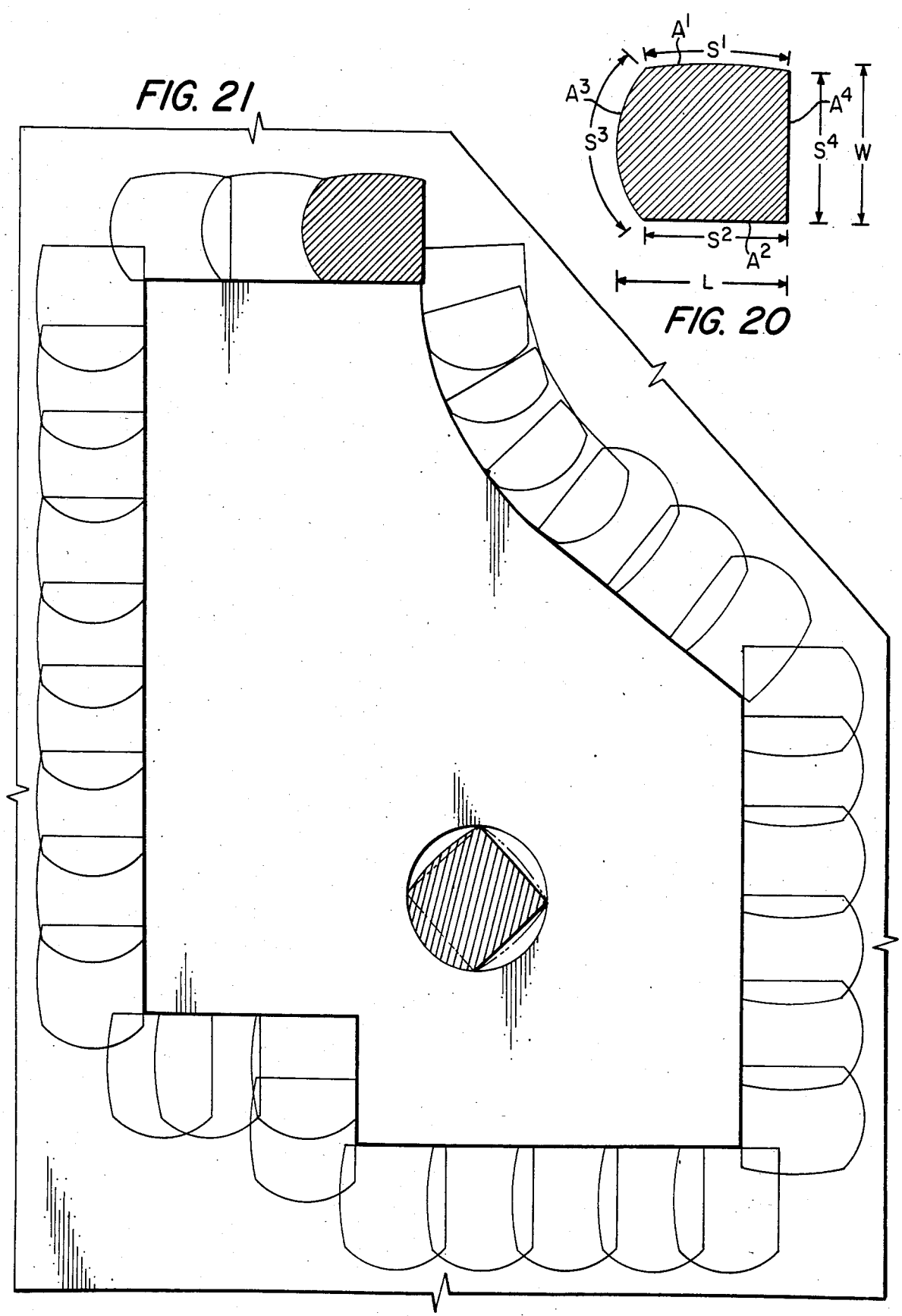

METHOD AND APPARATUS FOR NIBBLING CUTOUTS WITH RECTILINEAR AND CURVILINEAR CONTOURS BY ROTATION OF TOOLING WITH CUTTING SURFACES OF RECTILINEAR AND CURVILINEAR CONTOURS AND NOVEL TOOLING THEREFOR

BACKGROUND OF THE INVENTION

As is well known, punch presses are highly useful for producing various types of cutouts in sheet-like workpieces of metal, plastic, composite materials and the like. In recent years, numerically controlled punch presses have enabled the production of relatively complex cutouts by repetitive punch strokes in nibbling operations, because movement of a workpiece clamping mechanism may be controlled by an X-Y coordinate guidance system.

Moreover, with the advent of large turret assemblies in turret-type punch presses and with the later advent of automatic tool changer type punch presses, a fairly large amount of tooling may be provided within the press so that the operative punch and die may be readily changed. Thus, even complex configurations have been made possible through the optimization of computer numerically controlled systems in presses providing a multiplicity of interchangeable tools.

However, the configuration of cutouts that could be obtained by a punch press still has been dictated by the specific tooling available for operation without changing the tools in the turrets or in the tool changer carriers, and it has generally been necessary to change the tooling in the operative ram position in order to effect any modification in the cutout being produced. More recently in Hirata et al. U.S. Pat. No. 4,412,469 granted Nov. 1, 1983, it has been proposed to provide additional variation in the nature of the cutouts produced by a single set of tooling by providing a rotatable set of tooling in a turret-type punch press. More particularly, at two diametrically spaced positions in the turrets, there has been provided tooling which can be rotated by a pair of servomotors. As a result, rotation of the tooling may be coupled with the indexing of the workpiece to spaced positions to produce cutouts with the tooling rotated relative to the X and Y axes of movement of the workpiece so that the cutouts are at different angular relationships.

Even more recently, there has been introduced a tool changer type punch press in which the punch is rigidly coupled to the lower portion of the ram assembly so as to move integrally therewith and to provide a mechanism which effects rotation of the lower portion of the ram assembly and thereby the punch. Moreover, the die is firmly held in a die holder assembly which is rotated simultaneously with the ram assembly lower portion by the same drive mechanism. This punch press is illustrated and described in the copending application of Hans Klingel entitled "Punch Press With Rotary Ram And Method Of Operating Same", Ser. No. 661,399 filed Oct. 16, 1984.

The availability of such rotary action for the punch press tooling provided by these two rotary action presses has thus increased the versatility of a single set of tooling.

In nibbling or contouring operations, the punch tooling repetitively acts upon the workpiece as it is moved relative to the punching station to produce a series of overlapping cutouts which ultimately define a large contoured cutout, and this may have rectilinear and/or curvilinear edges. Generally, the tooling for such nibbling operations has utilized a relatively small diameter, generally cylindrical cutting portion on the punch and a cooperatively configured die, although polygonal cross section punches are also used. As is well known, the size of the punch that may be utilized is limited by the punching force generatable by the punch press, the thickness of the sheet material comprising the workpiece and the shear strength of the material comprising the workpiece. Moreover, the feed rate or rate at which the sheet materials is indexed to form the contoured edge on the workpiece will depend upon the amount of overlap of adjacent punch strokes which, in turn, is often dictated by the amount of roughness tolerable in the contoured edge.

As will be appreciated, nibbling of a straight line with the a circular punch will produce an edge defined by a series of arcs and the roughness will be dependent upon the feed rate per stroke as seen in FIG. 18a, where E represents the lineal advance of the workpiece or feed rate, $D_n$=diameter of the nibbling tool, and $R_t$=roughness or the width of the sector defined by the intersecting arcs of the adjacent punch cutouts.

The feed rate E for a straight edge is usually controlled to limit $R_t$ to 0.2–0.4 mm, determined in accordance with the following formula:

$$E = \sqrt{4 \cdot D_n \cdot R_t - R_t^2} \sim 2\sqrt{D_n \cdot R_t}$$

If the allowable roughness is greater and the diameter of the punch can be greater, then the feed rate E can be increased to produce the nibbled cutout faster.

Similarly, if a curved edge is to be nibbled, the feed rate is also dependent upon the amount of roughness as seen in FIG. 18b, where E=represents the lineal advance of the workpiece between strokes, $R_z$=the radius of the punch, $R_s$=the radius of the curve for the cutout, and $R_t$=roughness or the length of the sector defined by the intersecting arcs of the adjacent cutouts. The comparable formula is as follows:

$$E \sim \sqrt{4 \cdot D_n \cdot R_t} \cdot \sqrt{1 + \frac{D_n}{2R_s - D_n}} \text{ or}$$

$$E \sim \sqrt{8 \cdot R_z \cdot R_t} \cdot \sqrt{1 + \frac{R_z}{R_s - R_z}}$$

By use of a punch with an arcuate cutting face having the same radius as that of the desired curve for the cutout, the roughness produced by the nibbling can be eliminated. However, in almost all instances this would require a circular punch with a very large diameter and in turn requiring more power than the press has available to punch through the workpiece.

The force to cut through the workpiece with a circular punch is, for a single stroke cutout, determined in accordance with the formula:

$$F = D_s \cdot \pi \cdot S \cdot T_s$$

where $D_s$ is the diameter of the punch, S is the thickness of the sheet material, and $T_s$ is the shear strength of the sheet material. For the force required using a rectangular punch, the formula is:

$$F = (2L + 2W) \cdot S \cdot T_s$$

where L and W are the length and width of the punch cross section. It can be seen that the force required can rapidly reach and exceed the capacity of the press as thicker materials are employed.

A further factor that must be considered in punch design is that the width of the punch must be at least as great as, and preferably greater than, the thickness of the sheet material. If not, the punch is subject to breakage. Moreover, polygonal punches wear more rapidly in cutting sheet material than does a tool of circular cross section, and this is particularly significant as thicker sheet material is being punched.

In the copending application of Rudi Kuppinger, entitled "Method and Apparatus for Nibbling Cutouts by Rotation of Tooling with Cutting Surfaces of Different Contours and Tooling Therefor", Ser. No. 661,381 filed Oct. 16, 1984, there is disclosed an improved punch press apparatus and method for nibbling large contoured cutouts in workpieces using tooling wherein the punch cutting portion provides at least two cutting surfaces of different contours. As the workpiece is indexed, the tooling is rotated to provide an angular orientation of the desired cutting surfaces which closely conforms to the contour desired for that portion of the cutout. The tooling specifically illustrated is of elongated curvilinear cross section with a length L and a transverse width W which is less than ½ L. The arcuate faces along the longitudinal axes are generally determined by different radii and the preferred cross section is concavo-convex with the end portions blending into convex curved surfaces. The elongated curved cutting surfaces provided by this elongated punch tooling allows close approximation of the curvature of the desired contoured edge to eliminate roughness, and fewer strokes and a higher feed rate to produce the cutout. As the workpiece is being indexed, the punch tooling is rotated so as to closely conform to the desired contour.

This solution to the problem of contouring cutouts in nibbling operations has provided significant benefits. However, although it is beneficially employed to reduce roughness in rectilinear contours by reason of the large radius arcs that may be provided on the tooling, there has remained the problem of further reducing roughness along rectilinear contoured edges and in making clean cuts at corners. Although substitution of other sets of tooling for these purposes may be employed, this increases the time for the nibbling operation and increases the cost.

It is an object of the present invention to provide a novel punching method for nibbling sheet material workpieces to form contoured cutouts with both curvilinear and rectilinear surfaces and at a relatively rapid rate with one set, or a limited number of sets, of tooling.

It is also an object to provide such a method in which the tooling will generate both curvilinear and rectilinear contoured edges which are smooth or have little roughness.

Another object is to provide novel punch press assembly using such tooling for nibbling cutouts with straight and curved surface portions and including means for effecting controlled, rapid and arcuate rotation of the tooling and indexing of the workpiece along X and Y axes.

A further object is to provide novel punch tooling for rapidly nibbling contoured cutouts with both rectilinear and curvilinear portions in a workpiece when used in a punch press which will effect rotation of such tooling and precise indexing of the workpiece.

SUMMARY OF THE INVENTION

It has now been found that the foregoing and related objects may be readily attained by a method of nibbling contoured cutouts in a sheet-like workpiece in which there is provided a punch press having a frame with a base and a head spaced thereabove, a ram assembly on the head including a lower portion reciprocatable along a vertical axis relative to the base of the punch press frame. A punch is located in alignment with the ram assembly lower portion for reciprocation thereby, and it has a cutting portion with a cross section providing at least one arcuate cutting surface $A^1$ and at least one rectilinear cutting surface $A^2$. A die is located in alignment with the punch, and it has an aperture cooperatively dimensioned and configured to receive the cutting portion of the punch.

A sheet-like workpiece is supported between the die and punch, and the ram lower portion is reciprocated to drive the punch through the workpiece to produce a cutout. The workpiece is then indexed in a horizontal plane a predetermined distance relative to the vertical axis of reciprocation of the punch with the distance being not greater than the length of the punch cutting surface. The punch and die are rotated a predetermined amount to orient the desired one of the cutting surfaces at the cooperating angular position for the desired contour of the cutout in the workpiece; and the ram portion is reciprocated to drive the punch through the workpiece to produce a second cutout contiguous to the first cutout. These indexing, rotating and reciprocating steps are repeated to produce a large contoured cutout, with at least some of the rotation steps involving the presentation of cutting surfaces of different contour at the operative cutting position for the desired cutout. As a results, the angular orientation of a cutting surface may be varied to approximate closely the desired contour of the cutout and arcuate and rectilinear cutting surfaces be rotated into the operative cutting position.

Desirably, the cross section of the punch cutting portion provides at least two arcuate cutting surfaces $A^1$ and $A^3$ defined by different radii, and it may also provide two rectilinear cutting surfaces $A^2$ and $A^4$, which may be adjacent and intersect, preferably at a right angle.

The cross section may be elongated with a length L along its major axis and a width along its transverse axis perpendicular thereto which is less than ½ L with the surfaces $A^1$ and $A^2$ extending along the major axis. The surfaces $A^1$ and $A^2$ may be spaced apart at one end and blend into an arcuate surface $A^3$ which is defined by a radius $R^3$ which is less than $R^1$. The rectilinear surface $A^2$ may extend at an angle to the chord of the arcuate surface $A^1$ to provide a narrow cross section at one end thereof. The arcuate surface $A^1$ is desirably convexly arcuate as is the arcuate surface $A^3$.

More particularly, the punch press includes a frame providing a base and a head spaced thereabove, and a ram assembly mounted on the head of the frame with a lower portion reciprocatable for movement along a vertical axis towards and away from the base. First drive means is provided for reciprocating the lower portion of the ram assembly.

The assembly further includes a punch as heretofore defined and support means supporting the punch for reciprocation with the reciprocatable portion of the ram assembly. Also included is a die having an aperture therein cooperatively dimensioned and configured to receive the cutting portion of the punch, and means supporting the die in alignment with the punch.

Second drive means is provided for effecting equivalent rotation of the punch and die about a common vertical axis, and a work support table is supported on the frame and extends about the die for supporting an associated workpiece thereon. Workpiece clamping and moving means is supported on the frame for controlled movement of the associated workpiece along X and Y axes relative to the vertical axis defined by the axis of rotation of the punch and die. This workpiece clamping and moving means is movable along such axes by third drive means.

Control means controls the operation of the first drive means to effect reciprocation of the ram lower portion and controls the operation of the second drive means to effect rotation of the punch and die when the ram lower portion is spaced above the die. It also controls the third drive means for the workpiece clamping and moving means to effect precise indexing of the associated workpiece between strokes of the ram assembly to produce contiguous cutouts therein.

The preferred punch press is one in which coupling means is provided on the lower portion of the ram assembly which engages the punch on the lower end of the reciprocable ram portion to mount it securely thereon. The die is securely seated in a die holder rotatably supported on the base for rotation about an axis coaxial with that of the ram assembly lower portion and in alignment with the punch. The ram lower portion and die holder are rotated by rotational means which includes a first member driven by the second drive means, and a pair of vertically spaced, generally horizontally extending members movably supported on the frame. The horizontally extending members have first end portions drivingly engaged with the first member and opposite end portions drivingly engaged with the ram lower portion and die holder to effect simultaneous rotation thereof about the vertical axis. Preferably, the rotational means comprises intermeshing gear surfaces on the first and horizontally extending members and on the die holder and ram lower portion. The rotational means is actuatable by the second drive means in both directions of rotation to effect rotation of the ram lower portion and die holder in either direction of rotation.

BRIEF DESCRIPTION OF THE DRAWINGS

FIG. 9 is a diagrammatic view of a workpiece in which a circular cutout is a contoured or nibbled by a series of strokes in accordance with the present invention;

FIGS. 10-15 are diagrammatic views showing the successive strokes and indexing of the workpiece and rotation of the punch to produce the contoured cutout of FIG. 9.

FIG. 20 is a cross sectional view of the cutting portion of still another embodiment of punch for use in the present invention; and FIG. 21 is a diagrammatic view showing a workpiece being formed by a series of punch strokes with the punch of FIG. 20 to provide a cutout defining the contour of the desired part and a cutout within that part.

DETAILED DESCRIPTION OF THE ILLUSTRATED EMBODIMENTS

Figure 1:
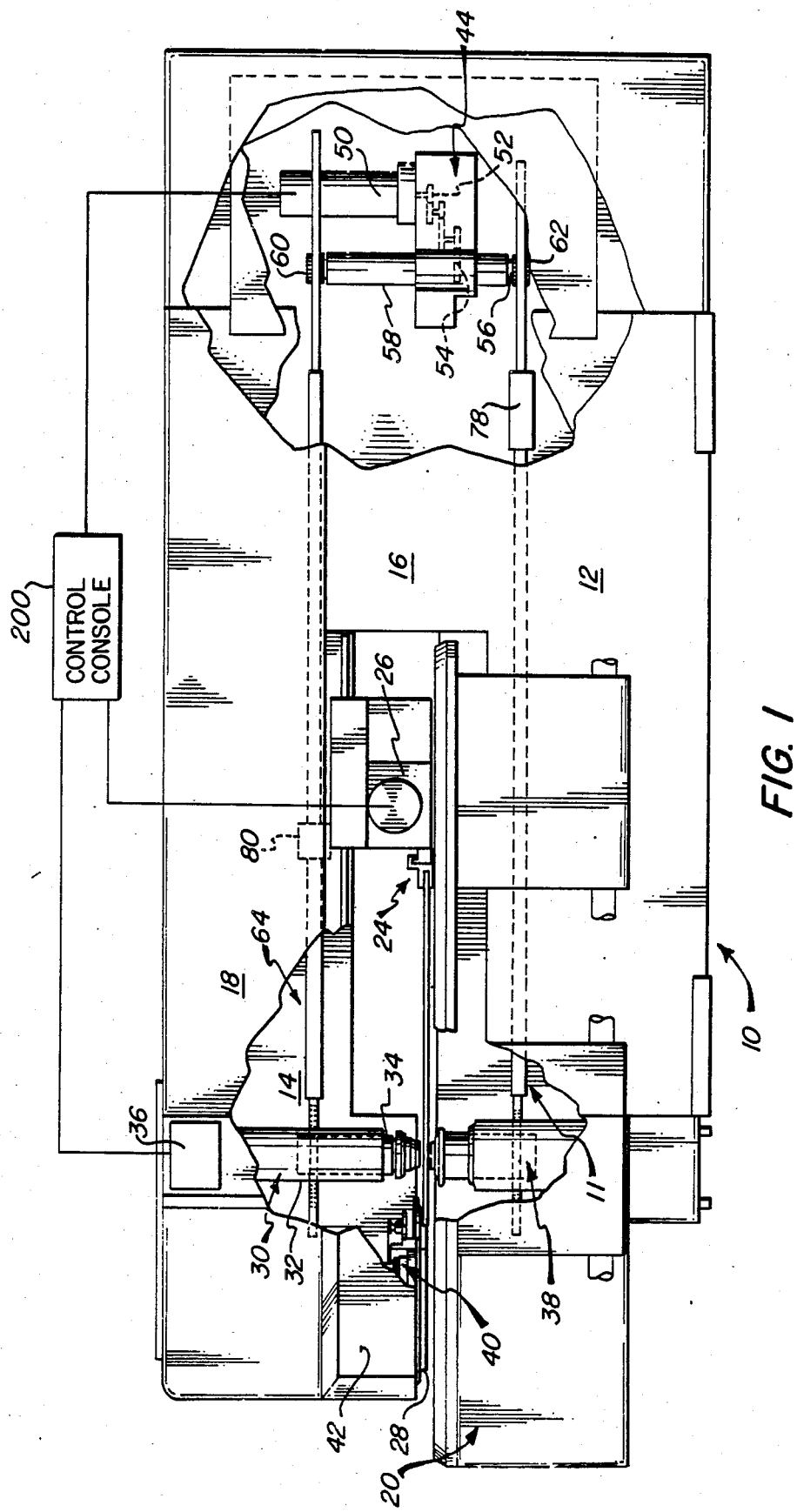
FIG. 1 is a partially diagrammatic side elevational view of an automatic tool changer type punch press embodying the present invention with portions broken away to reveal internal construction.

Turning in detail first to FIG. 1 of the attached drawings, therein illustrated is an automatic tool changer punch press embodying the present invention which has a C-shaped frame generally designated by the numeral 10 providing a base 12, a head 14 extending in spaced relationship thereabove, and a vertically extending web or center section 16 at the rear thereof. Sheet metal covers 18 are mounted along the sides and front and rear thereof to enclose various elements of the structure and mechanical, electrical and hydraulic components for safety and aesthetic considerations.

A worktable generally designated by the numeral 20 is supported on the base 12. A workpiece clamping and indexing assembly generally designated by the numeral 24 is supported on the base 12 of the frame 10 adjacent the center section 16, and is movable along X and Y axes relative to the table 20 by drive mechanisms including that in the drive housing 26. In this fashion, the workpiece 28 may be moved in X and Y directions on the table 20 under the head 14.

Mounted on the forward end of the head 14 of the frame 10 is a ram assembly generally designated by the numeral 30 and including an upper portion 32 and a reciprocatable lower portion 34. The drive mechanism for reciprocating the lower portion 34 of the ram assembly 30 is located in the upper portion of the ram assembly 30 and is diagrammatically illustrated by the numeral 36. Mounted on the base 12 of the frame 10 is a die holder assembly generally designated by the numeral 38. An automatic tool changer mechanism generally designated by the numeral 40 is disposed within the tool changer housing 42 at the front of the press.

In accordance with the present invention, the press includes a rotational assembly, generally designated by the numeral 44, for rotating the lower portion 34 of the ram assembly 30 and the die holder assembly 38. This includes a bi-directional motor 50 having a shaft on which is mounted the first of a series of gears in the gear train 52, which transmits the rotational output of the motor 50 to a pinion gear 54 mounted on the vertical shaft 56 intermediate its length. The shaft 56 is rotatably supported in the support member 58 and has pinion gears 60, 62 at its upper and lower ends.

Figure 2:
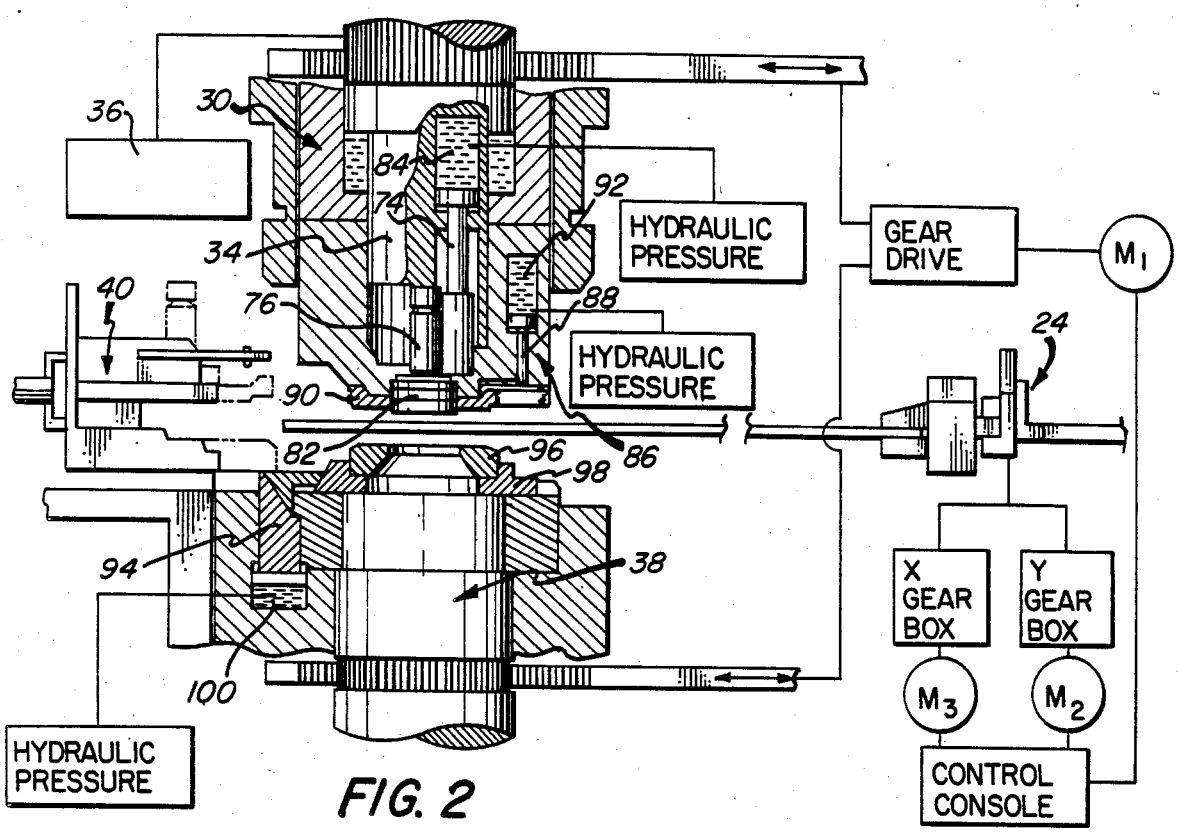
FIG. 2 is a partially diagrammatic, fragmentary side elevational view to an enlarged scale of the lower portion of ram assembly and upper portion of the die holder assembly with portions broken away to reveal internal construction, and also showing the automatic tool changer and workpiece clamping and guidance mechanisms and the gears for rotating the ram and die holder assemblies.

The pinion gears 60, 62 in turn mesh with rack gears 63 on the elongated horizontal members generally designated by the numerals 64, 66 which are slidably supported on guides 80 at spaced points along the length of the frame 10 for horizontal movement in either direction. The lower horizontal member 66 includes a threadably adjustable coupling 78 to permit adjustment of the overall length thereof. As best seen in FIG. 2, at their opposite ends the horizontal members 64, 66 have rack gears 63 which mesh with pinion gears 70, 72 on the periphery of the ram lower portion 34 and die holder assembly 38.

Turning now in detail to FIG. 2, the lower portion 34 of the ram assembly 30 has a hydraulic mechanism 74 which will clamp the stem 76 of the punch generally designated by the numeral 82 upon the introduction of pressurized hydraulic fluid to the chamber 84. The stripper holder assembly is generally designated by the numeral 86 and includes a hydraulic mechanism 88 for clamping the stripper 90 upon introduction of pressurized hydraulic fluid to the chamber 92. The die holder assembly 38 also has a hydraulic clamping mechanism 94 for clamping the die 96 in the die holder block 98 upon introduction of pressurized hydraulic fluid into the chamber 100. Diagrammatically shown is the drive mechanism 34 for the ram assembly 30 which may be a mechanical type using a crankshaft or eccentric to drive the ram assembly 30 and thereby to reciprocate the lower portion 34, or a hydraulic type in which the upper portion 32 is a cylinder in which reciprocates the upper end of the lower portion 34.

Figure 3:
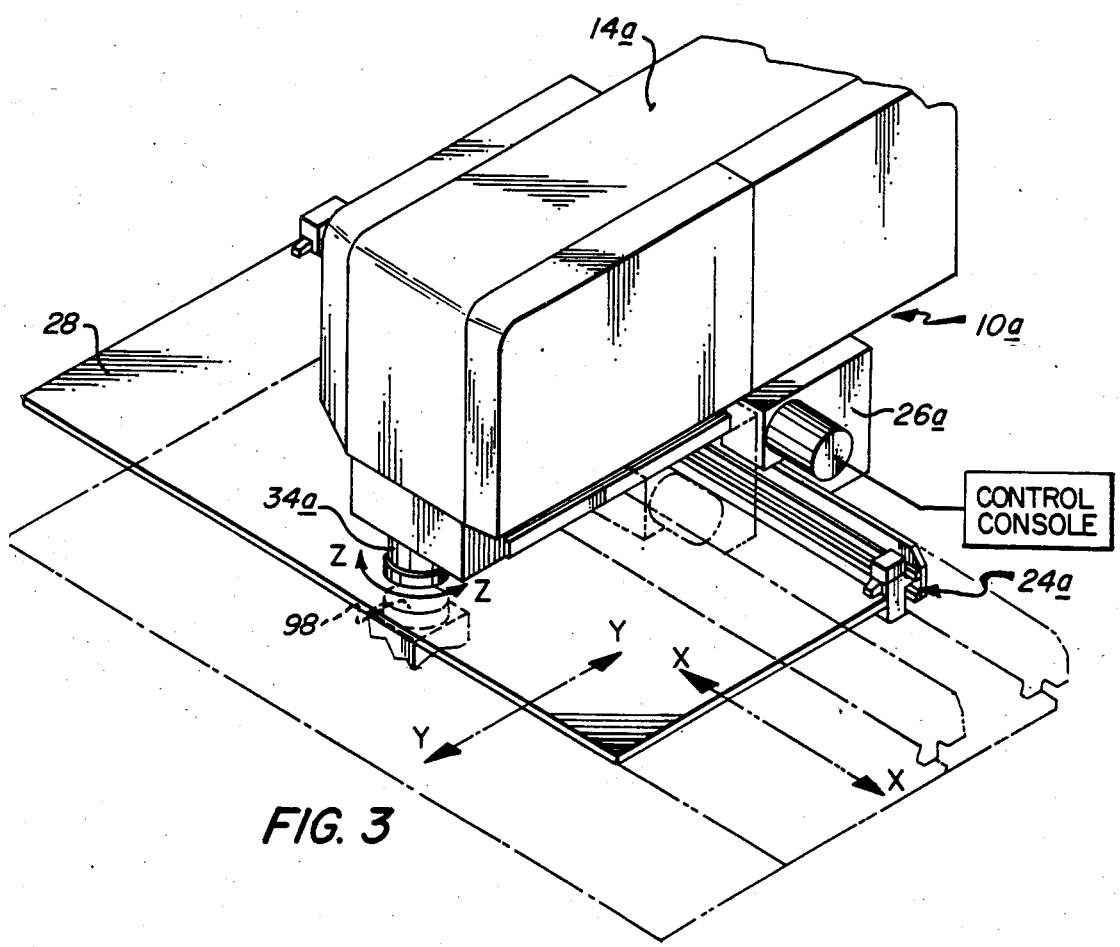
FIG. 3 is a partially diagrammatic and fragmentary perspective view of a manual tool changer type punch press with a workpiece on the worktable showing movement of the workpiece along X and Y axes by the workpiece clamping and guidance system.

In FIG. 3, there is fragmentarily illustrated a semi-automatic tool changer type punch press showing the head 14a of the frame 10a and the workpiece clamping mechanism 24a and one of its drive housings 26a. Between the lower portion 34a of the ram assembly and the die holder block 98 of the die holder assembly, is disposed a sheet-like workpiece 28 shown in phantom and solid line in several indexed positions resulting from movement of the clamping mechanism 24a into several indexed positions thereof also shown in phantom line and in solid line. The bi-directional rotation of the lower portion 34a of the ram assembly is indicated by the bi-directional arrow. In this type of press, the tooling is quickly changed in the ram assembly and in the die holder by manually operable tool cartridges.

Turning now to FIGS. 4–7, therein illustrated a cooperating punch and die set for the apparatus and method of the present invention. The punch 82 has a stem 76 which is clamped in the ram assembly 30, a body 104, a cutting portion 106 and an intermediate portion 108. The cutting portion 106 is of elongated cross section with a length L and tapers to a reduced height at one end. One side $A^1$ or principal surface is arcuate and defined by radius $R^1$. The other side $A^2$ or principal surface is rectilinear, and it intersects the arcuate surface $A^1$ at the shallow end. At the opposite end, the arcuate side surface $A^1$ and rectilinear side surface $A^2$ are spaced apart and blend into a convexly arcuate side surface $A^3$ defined by a much shorter radius $R^3$. The resultant configuration approximates that of an airfoil, or teardrop which is flattened on one side. The maximum width W of the cross section is defined by the area where the side surface $A^1$ and $A^2$ blend into the surface $A^3$, and it is less than 0.5 L, and preferably less then 0.4 L. In using this punch, the length of optimum working areas of the punch for the finished surface in the workpiece are designated by the lines $S^1$, $S^2$ and $S^3$ because of the change in curvature although the full surface length may be employed. The die 96 has an aperture 110 therein cooperatively dimensioned and configured to closely receive the cutting portion 106 of the punch 82.

Figure 8:
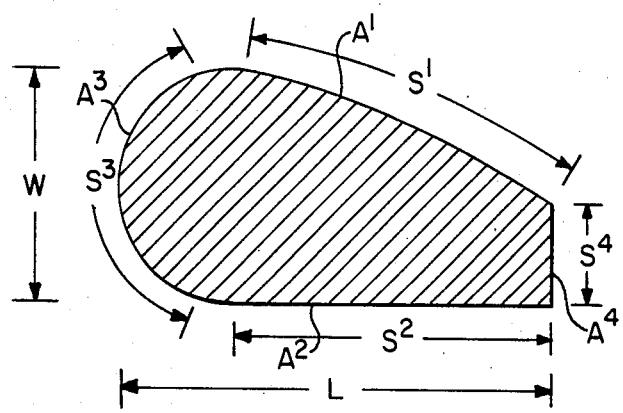
FIG. 8 is a bottom view of another embodiment of a punch for the assemblies of the present invention.
Figure 7:
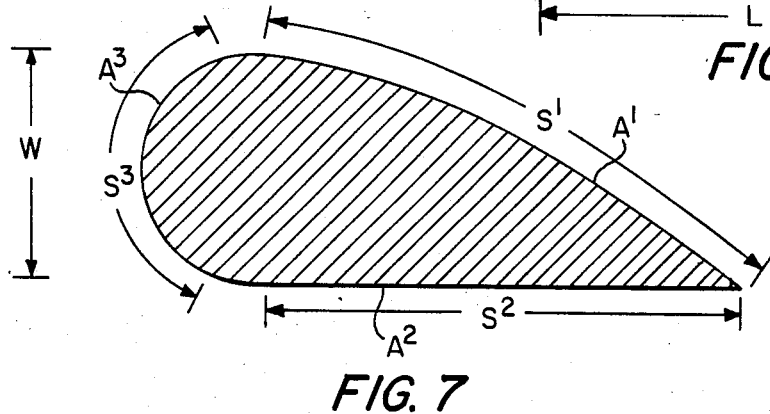
FIG. 7 is a cross sectional view to an enlarged scale of the cutting portion of the punch of FIGS. 4 and 5.

The punch of FIG. 8 is similar but its arcuate surface $A^1$ and rectilinear surface $A^2$ are intersected at the shallow or narrow end of the cutting portion by a short rectilinear surface $A^4$, which is perpendicular to the surface $A^2$.

The punch of FIG. 20 has a cross section which is not elongated, and it has two convexly arcuate cutting surfaces $A^1$ and $A^3$ which are adjacent and defined by the radii $R^1$ and $R^3$, and two rectilinear cutting surfaces $A^2$ and $A^4$ which are adjacent and intersect at a right angle. The arcuate surfaces $A^1$ and $A^3$ blend into each other and into the adjacent rectilinear surfaces $A^2$ and $A^4$.

Figure 4:
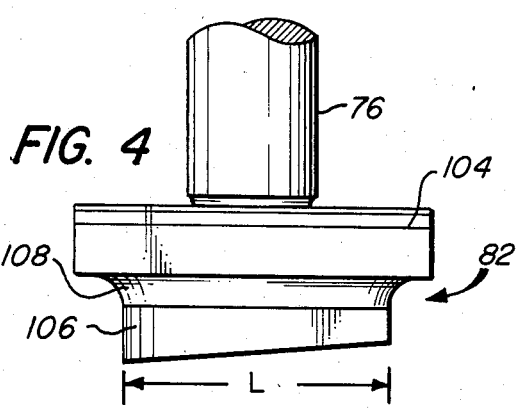
FIG. 4 is a fragmentary side elevational view of a novel punch for use in the punch press assemblies of the present invention.
Figure 5:
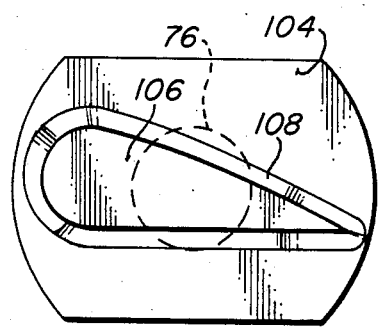
FIG. 5 is a bottom view of the punch in FIG. 4.
Figure 6:
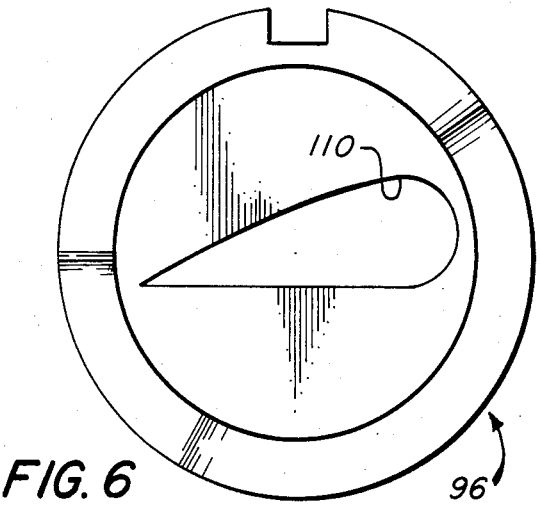
FIG. 6 is a plan view of the die used in combination with the punch of FIGS. 4 and 5.

Turning now to FIG. 9, therein illustrated is a workpiece 28 with a generally circular contoured cutout 112 which is formed by a series of six punch strokes using the punch and die set of FIGS. 4–6 with the overlapping cutouts produced by each stroke being indicated by the letters A–F.

As seen in FIG. 10, the workpiece 28 is indexed in both X and Y axes from an initial position shown in phantom line by the clamping and transport mechanism 24a, and the first punch stroke produces an arcuate cutout A. In FIG. 11, the workpiece 28 is indexed to the left along the X axis and the punch and die have been rotated 60° and the end of the punch overlaps the end of the cutout A; the punch stroke then produces an arcuate cutout B. In FIG. 12, the workpiece 28 is indexed along both X and Y axes, and the tooling rotated an additional 60°; the resultant punch stroke produces the overlapping cutout C.

In FIG. 13, the workpiece 28 has been indexed in both X and Y axes and the tooling rotated an additional 60°; the punch stroke produces the arcuate cutout D. In FIG. 14, the workpiece 28 has been indexed in the X direction and the tooling rotated 60°; the punch stroke produces the arcuate cutout E. In FIG. 15, the workpiece has been indexed along both X and Y axes and the tooling rotated an additional 60°; the punch stroke produces the arcuate cutout F to complete a circular contoured cutout with a relatively smooth edge.

In this instance, the tooling has been selected so that the radius of the arcuate surface $A^1$ is equal to the radius of the desired circular cutout and the length of the arcuate $A^1$ surface is greater than a 60° sector to permit overlapping of the ends of the cutouts.

Figure 16:
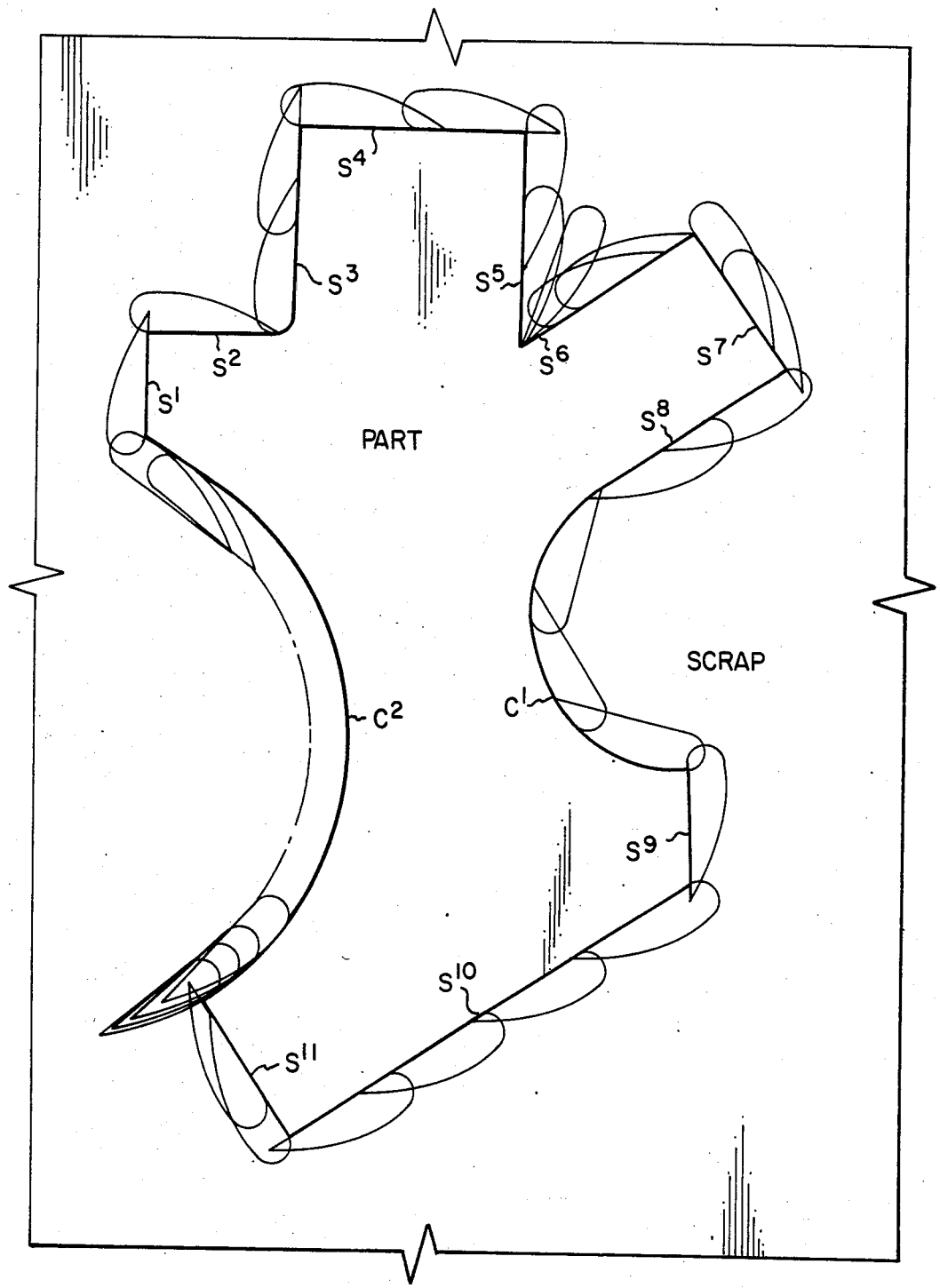
FIG. 16 is a diagrammatic view showing the rotated positions of the punch of FIGS. 4 and 5 in a complex contoured cutout with both rectilinear and curvilinear portions to produce a part.

Turning now to FIG. 16, the tooling of FIGS. 4-7 is utilized to cut a part of complex configuration with rectilinear portions and curvilinear portions and with both angular and arcuate corners. The punch strokes are diagrammatically shown. In the curved portion $C^1$, the arcuate surface $A^1$ conforms to its radius and the feed rate is relatively large and generates a smooth edge. In the curved portion $C^2$, the desired radius is larger than that of the surface $A^1$, and the feed rate is smaller to enable the tooling to rotate in small increments and generate the desired smooth edge. The rectilinear portions $S^1$-$S^7$ are all cut quickly by the rectilinear surface $A^2$ of the punch. Exterior right angles are formed simply as seen between the surfaces $S^1$ and $S^2$, $S^4$ and $S^3$ or $S^5$, and $S^7$ and $S^6$ or $S^8$. The shorter radius surface $A^3$ is used to generate relatively short radius inside corners as seen between the surfaces $S^2$ and $S^3$. The sharp corner of the punch is used to generate the acute corner intersection between the surfaces $S^5$ and $S^6$.

Thus, with the elongate tooling configuration of FIGS. 4-7, highly complex contours may be nibbled rapidly without the necessity for tool change.

Figure 17:
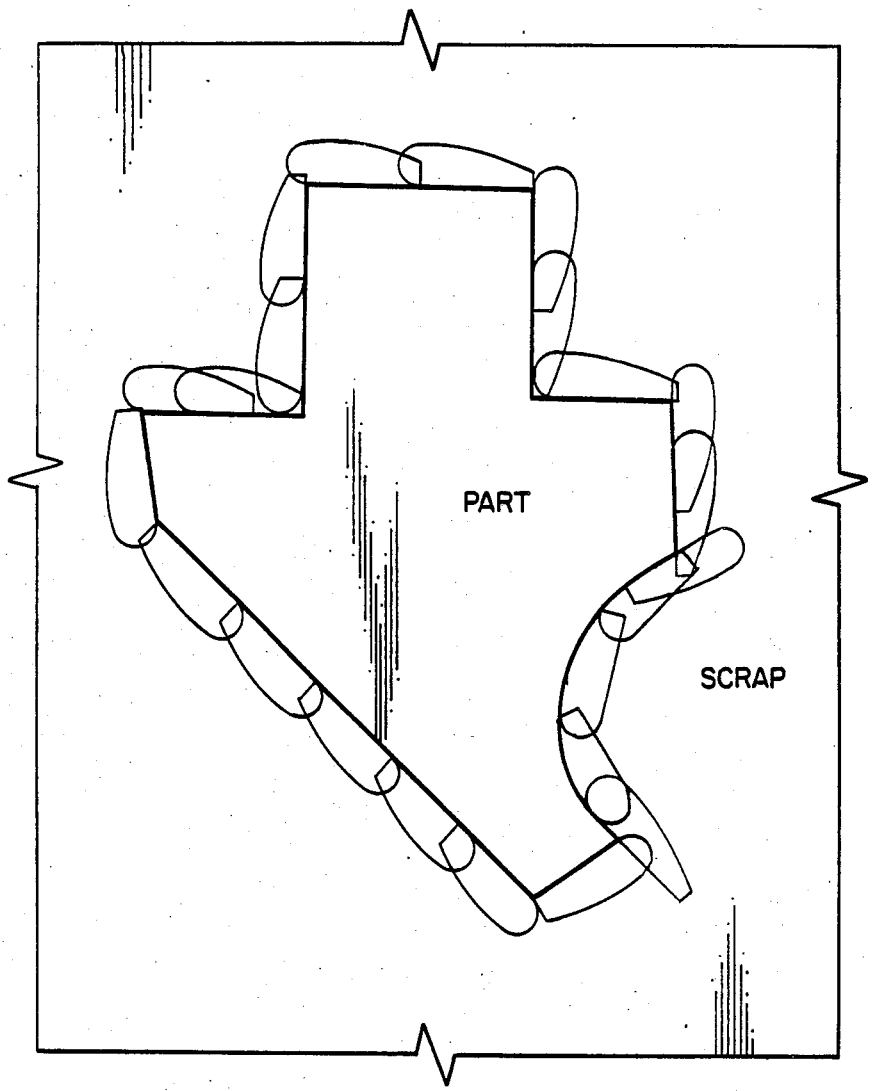
FIG. 17 is a similar view of a complex contoured cutout formed in a workpiece by the punch of FIG. 8.
Figure 18B:
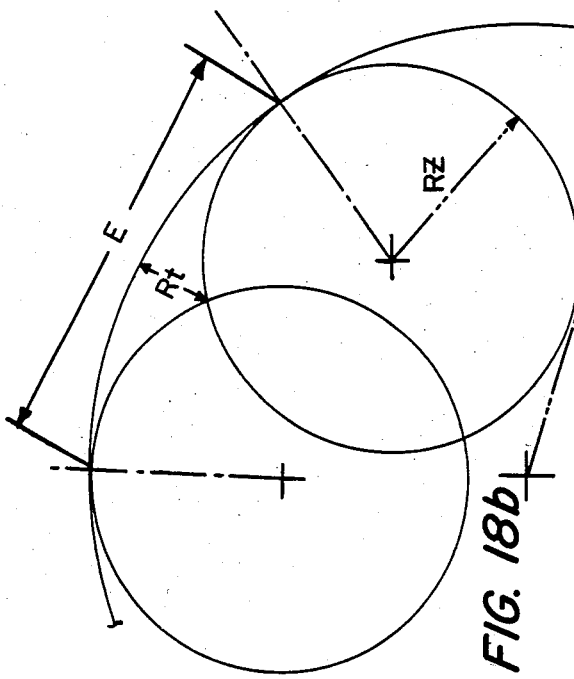
FIG. 18b is a similar view where the punch is nibbling a curvilinear edge.
Figure 18A:
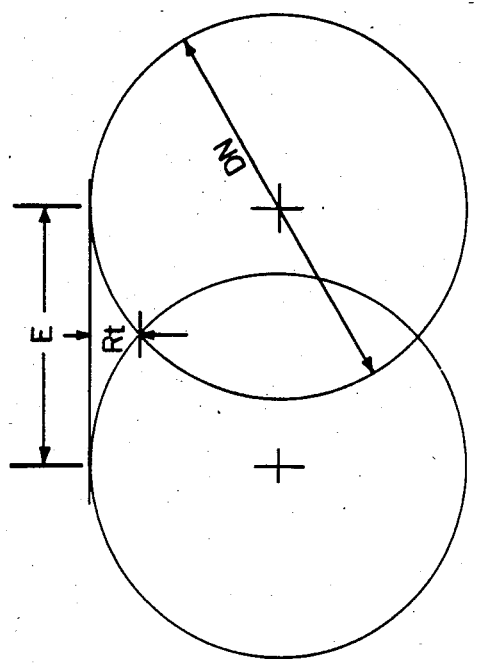
FIG. 18a is a diagrammatic view of a pair of punch strokes using a circular punch to nibble a rectangular edge.

The elongate tooling configuration of FIG. 8 is advantageous where a number of angular surfaces are to be formed in an inside cutting operation, i.e., the finished product is the workpiece with a contoured aperture therein. This is illustrated in FIG. 17.

The tooling of FIG. 20 is illustrative of a versatile cross section which is not elongated but defined by two adjacent rectilinear sides $A^2$ and $A^4$ which intersect at a right angle and two arcuate sides $A^1$ and $A^4$ with chords which extend perpendicularly to each other and to the sides $A^2$ and $A^4$. Although this punch configuration is not elongated, it can rapidly nibble a complex contour as seen by the diagrammatic illustration of FIG. 21 wherein it is used to nibble the central round cutout and thereafter to nibble the large contoured cutout defining the part.

In the apparatus and method of present invention, the curvilinear configuration along one side of the cutting portion provides an arcuate cutting surface $A^1$ which may closely conform to the desired curvature of the curved portion of the cutout, and the rectilinear cutting surface $A^2$ will conform to the rectilinear portion of the cutout. A shorter radius arcuate surface $A^3$ will provide another arcuate cutting surface able to conform more closely to a shorter radius portion of a cutout. A second rectilinear cutting surface $A^4$ may intersect the surface $A^2$ at a right angle, or at any other angle, to facilitate the forming of sharply defined corners.

In accordance with conventional construction, the control console 200 seen in FIGS. 1-3 contains control programs to effect automatic operation of the punch press. In the present invention, the program generates signals to effect automatic operation of the workpiece clamping and indexing assembly 24 to move the workpiece 28 along the X and Y axes, to reciprocate the ram assembly 30, to rotate the ram assembly 30, and to change the punch and die tooling as required. Thus, in nibbling a contoured cutout, programs provided therein produce signals to index the workpiece, reciprocate the ram assembly, and rotate the ram assembly concurrently with signals effecting the indexing of the workpiece a distance not greater than the length of the operative punch cutting edge surface. At least some of the signals orient different cutting edge surfaces of the punch and die in the operative position, and other signals orient the same cutting edge surface at a different angular orientation relative to the X and Y axes of the machine.

Figure 19C:
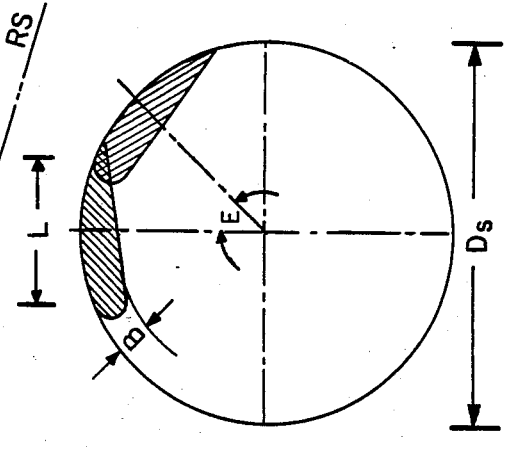
FIG. 19c is a diagrammatic view of the intended cutout superimposed with overlapping cutouts produced by use of the punch tooling of the present invention.

Illustrative of the advantages of the present invention is the following analysis. To produce the circular cutout seen in FIG. 19a with a punch of the same diameter would require a punching force determined in accordance with the formula:

$$F = D_s \cdot \pi \cdot S \cdot T_s$$

where $D_s$=diameter of the desired cutout, S=thickness of the workpiece and $T_s$ equals the shear strength of the workpiece material. If the diameter ($D_s$) of the desired cutout is 600 mm, the thickness of the sheet material is 2.5 mm and its shear strength is 320 Newtons/mm², the force required is 150 metric tons. Of course, the roughness ($R^t$) is 0.

Figure 19B:
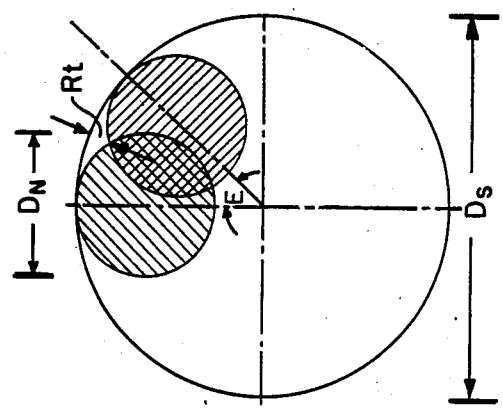
FIG. 19b is a similar diagrammatic view of the intended cutout with a pair of overlapped circular cutouts superimposed thereon.
Figure 19A:
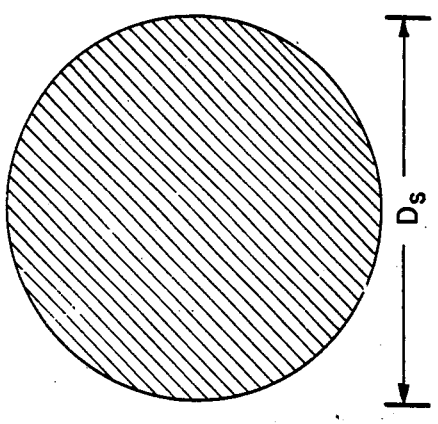
FIG. 19a is a diagrammatic view of a circular cutout.

In accordance with common practice, a circular punch of lesser diameter is conventionally employed with the punch strokes overlapping to produce arcuate sectors (or roughness) $R_t$ as seen in FIG. 19b. As indicated before, the feed rate determines the roughness, and the tolerable roughness will thus determine the feed rate. Generally, the feed rate to produce an acceptable overlap and resultant roughness will be on the order of 3-5 millimeters. Thus, the nibbling force required for the second and subsequent strokes would be determined in accordance with the formula:

$$F = \lambda \cdot D_n \cdot \pi \cdot S \cdot T_s$$

where $\lambda$ is determined by the amount of overlap and varies between 0.5-1.0. Assuming a punch of 50 mm. diameter ($D_n$) and an overlap (distance between centers) of 6.5 mm., the force required will be 12.6 metric tons for the initial stroke, and 285 strokes will be required to produce the desired cutout.

The roughness is determined by the formula:

$$R_t = \frac{D_s}{D_n} \cdot (D_s - D_n) \cdot \frac{1 - \cos E/2}{2 \cos E/2}$$

By combining the punch tooling of the present invention and rotation of the ram and die holder assemblies to rotate that tooling, the benefits of the present invention can be readily determined by referral to FIG. 19c and the formula:

$$F = (2L + B \cdot \pi) \cdot S \cdot T_s$$

where L=the lineal length of the cutting surface of the punch to its reversely curved ends, and B=the cross sectional width of the punch. In the drawing, E is the arc defined by the radii to the center of the punch in adjacent strokes.

For tooling of the type illustrated in FIGS. 4-7 with L=50 mm, a radius ($R^1$) of 300 mm., a cross sectional width (B) of 12 mm, and a feed rate (E) of 8°, the force required is 8.6 metric tons for the initial stroke, and 45 strokes will provide the full contoured cutout. The roughness will be 0.

Thus, while conventional nibbling with a circular punch will reduce the force required from 150 to 12.6 tons from that required for a circular punch of the desired radius, it will require 285 strokes and produce a rough edge. The method of the present invention using the elongated tool of FIGS. 4–7 enables reduction of the force to 8.6 metric tons and requires only 45 strokes to produce a smooth edge.

Although the preferred punch presses will be of the type illustrated herein where the punch and die are firmly secured to the ram assembly and in the die holder, may also be turret presses of the type described in the aforementioned Hirata et al U.S. Pat. No. 4,412,469 wherein the tooling is rotated in the turrets. However, such turret presses generally provide less accuracy in control of the punch movement and the opportunity for greater wear on the tooling and some misalignment between the adjacent cutouts produced by subsequent strokes.

Various combination of curvilinear and rectilinear surfaces in a cutout may be rapidly and smoothly cut by selection of tooling with the desired arcuate contour(s) and by rotating the tooling to dispose the desired cutting surface in the operative position and at the desired angular relationship.

Thus, the tooling may have a convexly arcuate surface as illustrated or a concavely arcuate surface. It may have a sharp intersection of the rectilinear surface with an arcuate surface or with a second rectilinear surface, and a wide section at one end and a narrow section at the other end. The angular intersection of two adjacent rectilinear surfaces may be at a right angle, or it may be at an acute or obtuse angle. The tooling configuration will be selected to provide the greatest opportunity to conform to the desired contour to be cut and whether the desired contoured surface is to be formed by the inside or outside of the cut.

In the elongated punch tooling of two of the illustrated embodiments, the maximum width W of the punch cutting portion is substantially less than the length L. Although any reduction of more than ½ will provide beneficial results, the width is preferably not more than 40% of L.

Reference may be made to Herb et al. U.S. Pat. No. 4,274,801 granted on June 23, 1981 for further description of X-Y guidance systems for the workpiece.

For detailed descriptions of suitable tool changer mechanisms, reference may be made to Herb, U.S. Pat. No. 3,816,904 granted June 18, 1974; and Herb et al, U.S. Pat. No. 4,103,414 granted Aug. 1, 1978.

References may be made to the aforementioned copending Klingel U.S. application Ser. No. 661,399 filed Oct. 16, 1984 entitled "Punch Press with Rotary Ram and Method of Operating Same" for greater details as to the preferred punch press structures utilizing drive means for rotating the tooling mounted on the ram assembly and in the die holder. The punch press of the Klingel application affords excellent control of the punching operation and the opportunity to minimize tool wear due to the fact that the punch and die are rigidly supported on the ram assembly and in the die holder assembly. The gear drive mechanism provides a relatively rugged assembly with precise control over the amount of rotation, and the rotation is simultaneously effected by the common drive mechanism. In the automatic tool changer embodiment, all tooling is readily available for use on the relatively rotatable ram and die holder members so as to afford a high degree of versatility and rapid tool change.

As indicated previously, although the punch press mechanism illustrated herein is of the mechanical drive type using a crank shaft, it should be readily appreciated that the present invention is also readily employable in connection with punch presses using hydraulic means to effect reciprocation of the lower portion of the ram assembly. In such presses, the upper portion of the ram assembly generally comprises a cylinder into which highly pressured hydraulic fluid is introduced to reciprocate the lower portion of the ram assembly which carries the punch. In such presses, a pinion gear ring is provided about the lower portion of the ram assembly and the housing thereabout provides clearance for the pinion gear to move axially therewithin.

Thus, it can be seen from the foregoing detailed specification and attached drawings that the nibbling or contouring method of the present invention is readily able to produce curvilinear and rectilinear surfaces in cutouts of various contours with a single set, or a limited number of sets, of tooling. The method is reliable and economical and provides a high degree of versatility.

The punch press assembly of the present invention is one which is rugged and which provides secure engagement of novel punch and tooling die and precisely controlled simultaneous rotation thereof to permit precision nibbling or contouring of the workpiece. By proper selection of the tooling, smooth curvilinear and rectilinear cutouts can be readily obtained, and improved polygonal cutouts can also be obtained. The programmed indexing of the workpiece coupled with programmed rotation of the ram assembly with the elongated punch tooling and of the die holder permits highly effective and rapid punching and contouring of smooth cutouts of relatively large configuration using the same set of tooling and, by substitution of one or more sets of tooling, even more complex configurations.

Having thus described the invention, what is claimed is:

1. In a method for nibbling contoured cutouts with both curvilinear and rectilinear portions in a sheet-like workpiece, the steps comprising:
   (a) providing a punch press having a frame with a base and a head spaced thereabove, a ram assembly on the head including a lower portion reciprocatable along a vertical axis relative to the base of said punch press frame;
   (b) locating a punch in alignment with said ram lower portion for reciprocation thereby along said vertical axis, said punch having a cutting edge portion extending across the lower end in a common plane and including at least one arcuate cutting edge surface $A^1$ defined by a radius $R^1$ and at least one rectilinear cutting edge surface $A^2$;
   (c) locating in alignment with said punch a die having an aperture cooperatively dimensioned and configured to receive said cutting edge portion of said punch, said punch and die defining a workstation therebetween substantially in alignment with said vertical axis of said ram assembly lower portion;
   (d) supporting a sheet-like workpiece at said workstation between said die and punch;
   (e) reciprocating said ram lower portion to reciprocate and drive said cutting edge portion of said punch through said workpiece at said workstation to produce a cutout;

(f) indexing said workpiece in horizontal plane a predetermined distance relative to said workstation, said distance being less than the length of a first one of said punch cutting edge surfaces;

(g) rotating said punch and die at said workstation substantially at and about said vertical axis a predetermined amount to orient a desired one of said cutting edge surfaces at the desired angular position for the desired contour of a large contoured cutout in said workpiece;

(h) reciprocating said ram lower portion to drive said cutting edge portion of said punch through said workpiece at said workstation to produce a second cutout contiguous to said first cutout; and (i) repeating steps (f)–(h) to produce a large contoured cutout, at least some of said rotation steps effecting rotation of said punch and die substantially at and about said vertical axis to orient the other one of said cutting edge surfaces at the desired angular position for the desired contour of the large contoured cutout in said workpiece and at least some of said rotation steps consecutively effecting rotation of said punch and die substantially in and about said vertical axis to orient the same cutting edge surface at the desired angular position for that portion of the desired contour of the large contoured cutout in said workpiece, thereby defining said contour of said large contoured cutout with rectilinear surface portions and arcuate surface portions by at least said two cutting surfaces.

2. The method in accordance with claim 1 wherein said punch cutting edge portion has the cutting edge surfaces $A^1$ and $A^2$ extending along opposite sides thereof and spaced apart adjacent one end thereof and blending into a convexly arcuate cutting edge surface $A^3$ defined by the radius $R^3$ which is less than $R^1$; and wherein there are included the additional steps of rotating said punch and die to orient the cutting edge surface $A^3$ at a desired angular position to form a portion of the contour for the large contoured cutout in the workpiece.

3. The method in accordance with claim 2 wherein said rectilinear surface $A^2$ and arcuate surface $A^1$ intersect at the opposite end therof and wherein said rotation steps orient each of said cutting edge surfaces $A^1$ and $A^2$ in the desired angular position for a multiplicity of steps of reciprocation.

4. The method in accordance with claim 1 wherein said punch cutting edge portion has the cutting edge surfaces $A^1$ and $A^2$ extending along opposite sides thereof and wherein said rectilinear surface $A^2$ extends at an acute angle to the chord extending between the ends of the arcuate cutting edge surface $A^1$ to provide a narrow cross section at one end thereof; and wherein said punch and die are rotated to orient said one end of said punch and die at the desired angular position for a portion of the cutout in the workpiece.

5. The method in accordance with claim 1 wherein said arcuate surface $A^1$ is convexly arcuate and wherein said rotation steps orient each of said cutting edge surfaces $A^1$ and $A^2$ in the desired angular position for a multiplicity of steps of reciprocation.

6. The method in accordance with claim 1 wherein said cutting edge portion is elongated to provide an elongated cross section with a length L along an axis in the cross sectional plane extending in the direction of elongation and a width W along the axis in the cross sectional plane extending perpendicularly thereto which is less than ½ L; wherein said cutting edge surfaces $A^1$ and $A^2$ are disposed along the opposite elongated sides; and wherein said rotation steps orient each of said cutting edge surfaces $A^1$ and $A^2$ in the desired angular position for a multiplicity of steps of reciprocation.

7. The method in accordance with claim 1 wherein said cutting edge portion provides four cutting edge surfaces, two adjacent surfaces $A^1$ and $A^3$ being arcuate and defined by radii $R^1$ and $R^3$ of different length, and two adjacent surfaces $A^2$ and $A^4$ being rectilinear, and wherein said rotation steps orient each of said cutting edge surfaces $A^1$ and $A^2$ in the desired angular position for a multiplicity of steps of reciprocation.

8. The punch press of claim 1 wherein said arcuate surface $A^1$ and said rectilinear surface $A^2$ extend along opposite sides of said cutting edge portion and are spaced apart at one end of said cutting portion and blend into a convexly arcuate surface $A^3$ defined by radius $R^3$ which is smaller than $R^1$.

9. The punch press of claim 8 wherein said arcuate surface $A^1$ and rectilinear surface $A^2$ intersect at the opposite end.

10. In a punch press, the combination comprising:

(a) a frame providing a base and a head spaced thereabove;

(b) a ram assembly mounted on said head of said frame with a lower portion reciprocatable on said head for movement along a vertical axis towards and away from said base;

(c) first drive means for reciprocating said lower portion of said ram assembly along said vertical axis;

(d) a punch having a cutting edge portion extending across the lower end of said punch in a common plane and including at least two cutting edge surfaces $A^1$ and $A^2$ of different contour, the cutting surface $A^1$ being arcuate and defined by the radius $R^1$ and the cutting surface $A^2$ being arcuate and defined by the radius $R^2$, said arcuate surfaces $A^1$ and $A^2$ being non-parallel;

(e) means supporting said punch for reciprocation with said lower portion of said ram assembly and for rotation about an axis substantially coaxial with said vertical axis of reciprocation of said ram assembly lower portion;

(f) a die having an aperture therein cooperatively dimensioned and configured to receive said cutting edge portion of said punch;

(g) means supporting said die in alignment with said punch and for rotation about an axis coaxial with said axis of rotation of said punch, said punch and die defining a workstation therebetween substantially in alignment with said vertical axis of reciprocation of said ram assembly lower portion;

(h) second drive means for effecting simultaneous and equivalent rotation of said punch and said die about said axis of rotation at said workstation;

(i) a work support table supported on said frame and extending about said die for supporting an associated workpiece thereon;

(j) workpiece clamping and moving means supported on said frame for controlled movement of the associated workpiece along X and Y axes relative to said workstation and the vertical axis of reciprocation and the axis of rotation of said punch and die;

(k) third drive means for said workpiece clamping and moving means;

(1) control means for controlling the operation of said first and second drive means to effect reciprocation of said ram lower portion and for controlling the operation of said second drive means to effect rotation of said punch and die when said punch is spaced above said die, and for controlling said third drive means for said workpiece clamping and moving means to effect precise indexing of the associated workpiece relative to said workstation along said X and Y axes between strokes of the ram assembly to produce contiguous cutouts therein, said control means including program means for generating a series of signals to the operative drive means following a punching stroke (i) to index the indexing means and thereby an associated workpiece in a horizontal plane a predetermined distance relative to said workstation to a second position which distance is not greater than the operative punch cutting edge surface, (ii) to rotate the punch and die about said vertical axis at said workstation to change the orientation of said operative cutting edge surface relative to said X and Y axes, (iii) to reciprocate the ram assembly in said second position of said clamping and moving means, (iv) to index the clamping and moving means in a horizontal direction to a further indexed position a distance not greater than a second punch cutting edge surface, (v) to rotate the punch and die about said vertical axis at said workstation to orient the second punch cutting edge surface in operative position; (vi) to reciprocate said ram assembly in said further indexed position of said indexing means, said series of signals producing a multiplicity of the steps (i) through (vi) above for defining the contour of a large contoured cutout in an associated workpiece by the cutting action of at least said two cutting surfaces and portions of the periphery of the cutout by rotated positions of at least one of said cutting surfaces, whereby the angular orientation of a cutting edge surface may be varied to approximate closely that desired contour for a large contoured cutout in the workpieces and cutting edge surfaces of different contours may be rotated into the contouring position.

11. The punch press of claim 10 wherein said rectilinear surface $A^2$ extends at an acute angle to the chord extending between the ends of said arcuate edge surface $A^1$ to provide a narrower width adjacent one end of said cutting edge portion.

12. The punch press of claim 10 wherein said arcuate surface $A^1$ is convexly arcuate.

13. The punch press of claim 10 wherein said cutting portion is elongated to provide an elongated cross section with a length L along an axis in the cross sectional plane extending in the direction of elongation and a width W along the axis in the cross sectional plane extending perpendicularly thereto which is less than ½ L, said surfaces $A^1$ and $A^2$ extending along the opposite elongated sides.

* * * * *